(12) United States Patent
Clericus et al.

(10) Patent No.: US 11,796,076 B1
(45) Date of Patent: Oct. 24, 2023

(54) PRESSURE ACCOMODATING ASSEMBLY

(71) Applicant: VERNAY LABORATORIES, INC., Hapeville, GA (US)

(72) Inventors: Kurt Lowell Clericus, Union, OH (US); James Theodore Stope, Waynesville, OH (US); Martin Jozef Reef, Enschede (NL); Jerrod McClain Etienne, Cynthiana, KY (US); Elizabeth Quigley, Langhorne, PA (US); Oscar Daniel Louis Teunisse, Almelo (NL); Gerrit Jan Weekenstroo, Enschede (NL); Dennis Kolkman, Den Ham (NL); Evert Van Den Hurk, Enschede (NL); Anthony Robert Stroik, Locust Grove, GA (US); Kenneth Gerhard Madden, Newnan, GA (US); Andrew Douglas Woodward, Hilton Head, SC (US); Robert Christopher Ferguson, Newnan, GA (US)

(73) Assignee: VERNAY LABORATORIES, INC., Hapeville, GA (US)

( * ) Notice: Subject to any disclaimer, the term of this patent is extended or adjusted under 35 U.S.C. 154(b) by 0 days.

(21) Appl. No.: 17/739,646

(22) Filed: May 9, 2022

(51) Int. Cl.
*F16K 15/14* (2006.01)
*F16K 27/02* (2006.01)
(Continued)

(52) U.S. Cl.
CPC .......... *F16K 15/148* (2013.01); *B01D 46/543* (2013.01); *B01D 71/36* (2013.01);
(Continued)

(58) Field of Classification Search
CPC . B01D 46/543; B01D 71/36; H01M 8/04089; H01M 50/325; F16K 24/0406;
(Continued)

(56) References Cited

U.S. PATENT DOCUMENTS

| 3,638,626 A | 2/1972 | Marshall |
| 4,522,863 A | 6/1985 | Keck et al. |

(Continued)

FOREIGN PATENT DOCUMENTS

| DE | 19523454 A1 * | 1/1997 | ........... F16H 57/027 |
| DE | 102012202103 A1 * | 8/2013 | ........... H05K 5/0213 |

(Continued)

OTHER PUBLICATIONS

Kaynak, et al., Polyester Microfilament Woven Fabrics, May, 2012, pp. 155-178.

(Continued)

*Primary Examiner* — Hailey K. Do
(74) *Attorney, Agent, or Firm* — Thompson Hine LLP (57) ABSTRACT

A system including a pressure accommodating assembly having a body with a first side and a second side. The assembly further includes a gas permeable membrane coupled to the body and configured to allow gases to permeate therethrough to thereby move from the first side to the second side. The assembly also includes a pressure relief valve coupled to the body, wherein the pressure relief valve is biased to a closed position to generally block a flow of gases therethrough and is configured to move to an open position when there is a predetermined pressure differential thereacross to allow gases to flow therethrough to move from the first side to the second side. The pressure accommodating assembly is configured to maintain its structural integrity after being exposed to a temperature of about 500° C.

20 Claims, 7 Drawing Sheets

(51) Int. Cl.
  *B01D 71/36* (2006.01)
  *B01D 46/54* (2006.01)
  *H01M 8/04089* (2016.01)
  *H01M 8/04746* (2016.01)
  *H01M 50/325* (2021.01)

(52) U.S. Cl.
  CPC ..... *F16K 27/0209* (2013.01); *H01M 8/04089* (2013.01); *H01M 8/04753* (2013.01); *H01M 50/325* (2021.01); *H01M 2220/20* (2013.01); *H01M 2250/20* (2013.01)

(58) Field of Classification Search
  CPC .... F16K 17/164; F16K 17/18; F16K 15/1401; F16K 15/148
  See application file for complete search history.

(56) References Cited

U.S. PATENT DOCUMENTS

| | | | |
|---|---|---|---|
| 5,215,312 A | | 6/1993 | Knappe et al. |
| 5,752,746 A | * | 5/1998 | Perry .................. B60B 7/00 301/108.4 |
| 6,043,629 A | | 3/2000 | Ashley et al. |
| 7,678,492 B2 | | 3/2010 | Schulte-Ladbeck |
| 7,737,655 B1 | | 6/2010 | Devaney et al. |
| 7,846,570 B2 | | 12/2010 | Diehl et al. |
| 7,951,474 B2 | | 5/2011 | Schembri et al. |
| 8,263,242 B2 | | 9/2012 | Yebka et al. |
| 8,357,462 B2 | | 1/2013 | Zhu et al. |
| 9,331,322 B2 | | 5/2016 | Lee et al. |
| 9,806,310 B1 | | 10/2017 | Pounds |
| 10,020,477 B2 | | 7/2018 | Lomax et al. |
| 10,312,490 B2 | | 6/2019 | Maguire |
| 10,557,561 B2 | | 2/2020 | Kleinke et al. |
| 10,707,464 B2 | | 7/2020 | Freiman et al. |
| 11,047,508 B2 | | 6/2021 | Sanders et al. |
| 2007/0222840 A1 | | 9/2007 | Xiao et al. |
| 2007/0231677 A1 | * | 10/2007 | Stocchiero .......... H01M 50/325 429/82 |
| 2009/0120949 A1 | | 5/2009 | Mashiko |
| 2010/0187230 A1 | | 7/2010 | Beer et al. |
| 2011/0006731 A1 | | 1/2011 | Wang et al. |
| 2017/0187018 A1 | * | 6/2017 | Pflueger ............... H05K 5/0213 |
| 2018/0292020 A1 | | 10/2018 | Kleinke et al. |

FOREIGN PATENT DOCUMENTS

| | | | |
|---|---|---|---|
| DE | 102018111850 A1 | * | 11/2019 |
| EP | 1 892 029 A1 | | 2/2008 |
| JP | 2015170471 A | | 9/2015 |
| WO | 2003/086951 | | 10/2003 |
| WO | 2016/180972 | | 11/2016 |

OTHER PUBLICATIONS

U.S. Appl. No. 62/478,872, filed Mar. 30, 2017, 27 pages.
U.S. Patent and Trademark Office, International Search Report and Written Opinion, issued in International patent application No. PCT/US2023/011380 dated Apr. 5, 2023. 12 pages.

* cited by examiner

PRESSURE ACCOMODATING ASSEMBLY

The present disclosure is directed to a pressure accommodating assembly, and more particularly, to a pressure accommodating assembly that can accommodate relatively high pressure and/or temperatures.

BACKGROUND

Pressure relief assemblies are used to accommodate pressure differentials across differing spaces. More particularly, pressure relief assemblies can be used in conjunction with sealed casings that store chemical reactors, such as electric batteries, fuel cells or the like, therein. In certain circumstances the components positioned in the casing may experience a thermal runaway event which create high pressures and/or temperatures. Many existing pressure relief assemblies are incapable of accommodating such high pressures and/or temperatures.

SUMMARY

In one embodiment the present disclosure is directed to a pressure relief assembly that can effectively accommodate pressure differentials and/or high temperatures, and more particularly may be able to withstand the pressures and/or temperatures associated with a thermal runaway event and remain functional. In one embodiment the invention is a system including a pressure accommodating assembly having a body with a first side and a second side. The assembly further includes a gas permeable membrane coupled to the body and configured to allow gases to permeate therethrough to thereby move from the first side to the second side. The assembly also includes a pressure relief valve coupled to the body, wherein the pressure relief valve is biased to a closed position to generally block a flow of gases therethrough and is configured to move to an open position when there is a predetermined pressure differential thereacross to allow gases to flow therethrough to move from the first side to the second side. The pressure accommodating assembly is configured to maintain its structural integrity after being exposed to a temperature of about 500° C.

DETAILED DESCRIPTION

Figure 1:
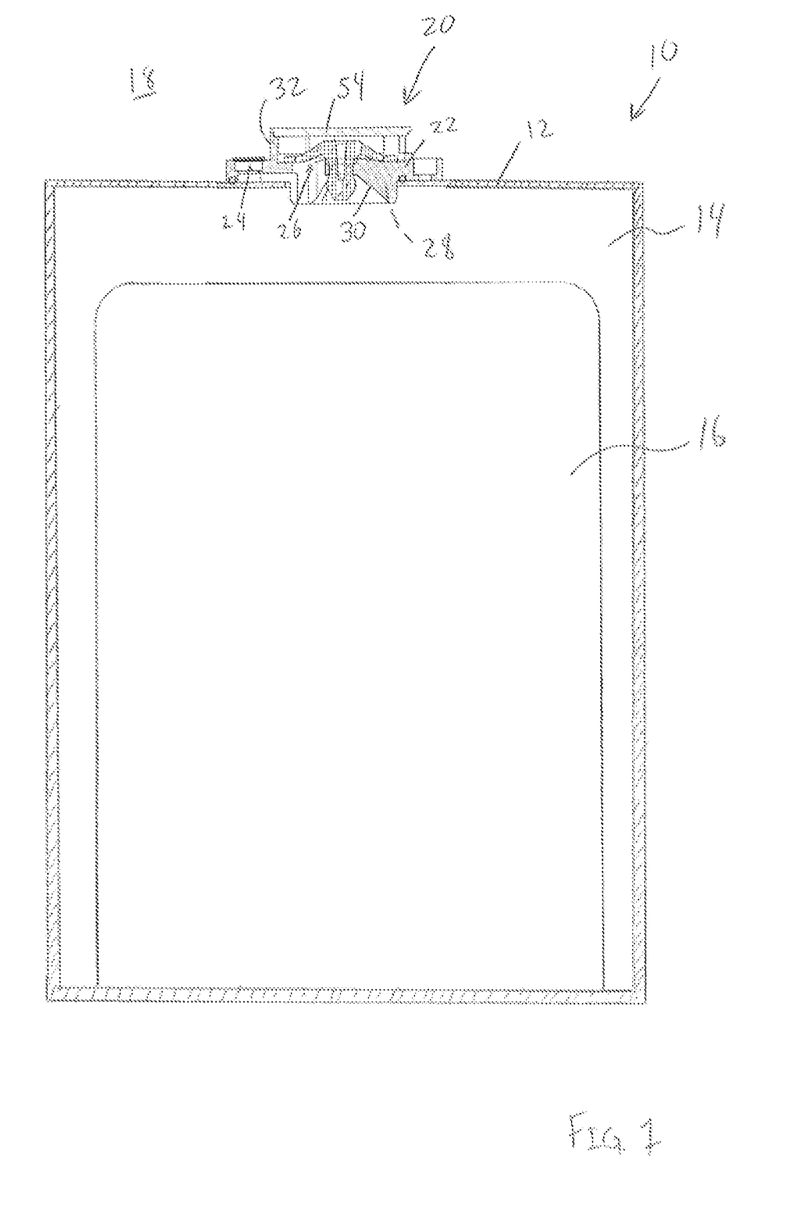
FIG. 1 is a side cross section view of a casing having a chemical reactor positioned therein, with a pressure accommodating assembly incorporated therein.
Figure 2:
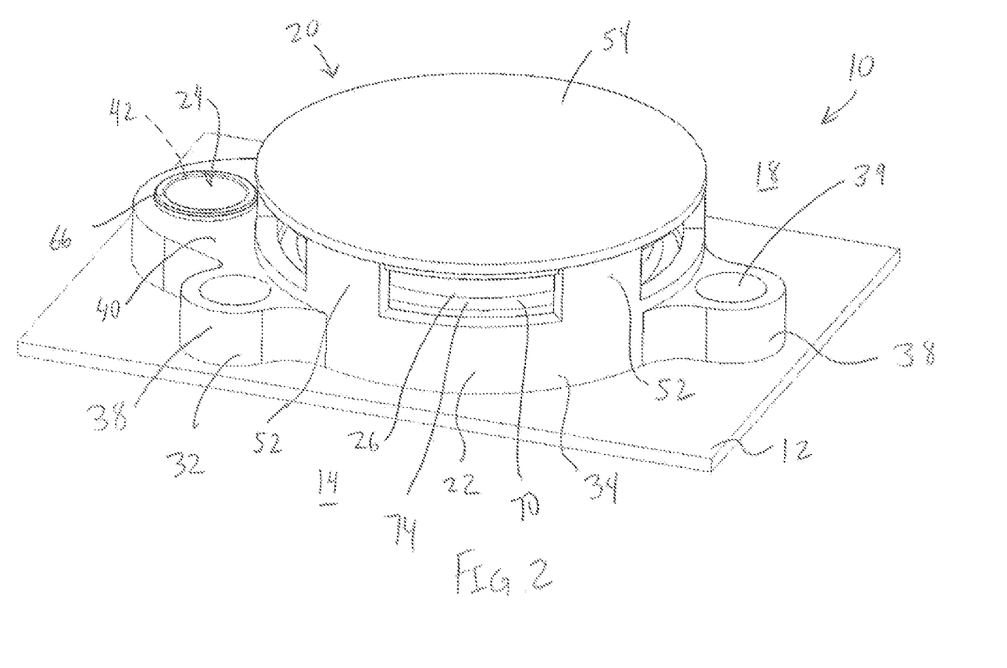
FIG. 2 is a detail perspective view of the assembly of FIG. 1, shown in conjunction with part of the casing.

With reference to FIG. 1, a system, generally designated 10, can include a sealed or closed, or generally sealed or closed, casing 12 having or defining an inner cavity 14, with a chemical reactor 16 (such as a battery, fuel cell or the like) positioned in the inner cavity. In some cases the casing 12 can be positioned inside or considered part of a motor vehicle. In this or other cases the chemical reactor 16 can be electrically and/or operatively coupled to the motor vehicle and/or various subsystems thereof through various cables, wires or the like (not shown) which are electrically coupled to the chemical reactor 16 and pass through the casing 12 in a sealed manner.

Since the casing 12 is sealed or generally sealed, it may be desired to provide pressure balance with respect to the ambient environment 18. For example, the chemical reactor 16 may generate heat (and thus increased pressure), and/or there may be changes in ambient pressures or temperatures or the like, which may need to be accommodated to avoid damage to the casing 12 and/or chemical reactor 16. Accordingly a pressure relief assembly, generally designated 20, can be provided in, coupled to or form part of the casing 12 to provide pressure balance across the casing 12.

The pressure relief assembly 20 can include a body 22, and a membrane 24 a pressure relief valve 26 coupled to the body 22. The body 22 can be sealingly fit into an opening 28 of the casing 12. The assembly 20 and/or body 22 can include a first, or inner side 30 that is in fluid communication with the inner cavity 14 in one case, and a second, or outer, side 32 that is in fluid communication with the surrounding/ambient environment or atmosphere 18 in one case. In this manner the pressure relief assembly 20, and more specifically both the membrane 24 and the valve 26, are positioned in or are in fluid communication with the inner cavity 14, on the inner side 30, and are positioned in or are in fluid communication with the ambient environment 18, on the outer side 32.

Figure 6:
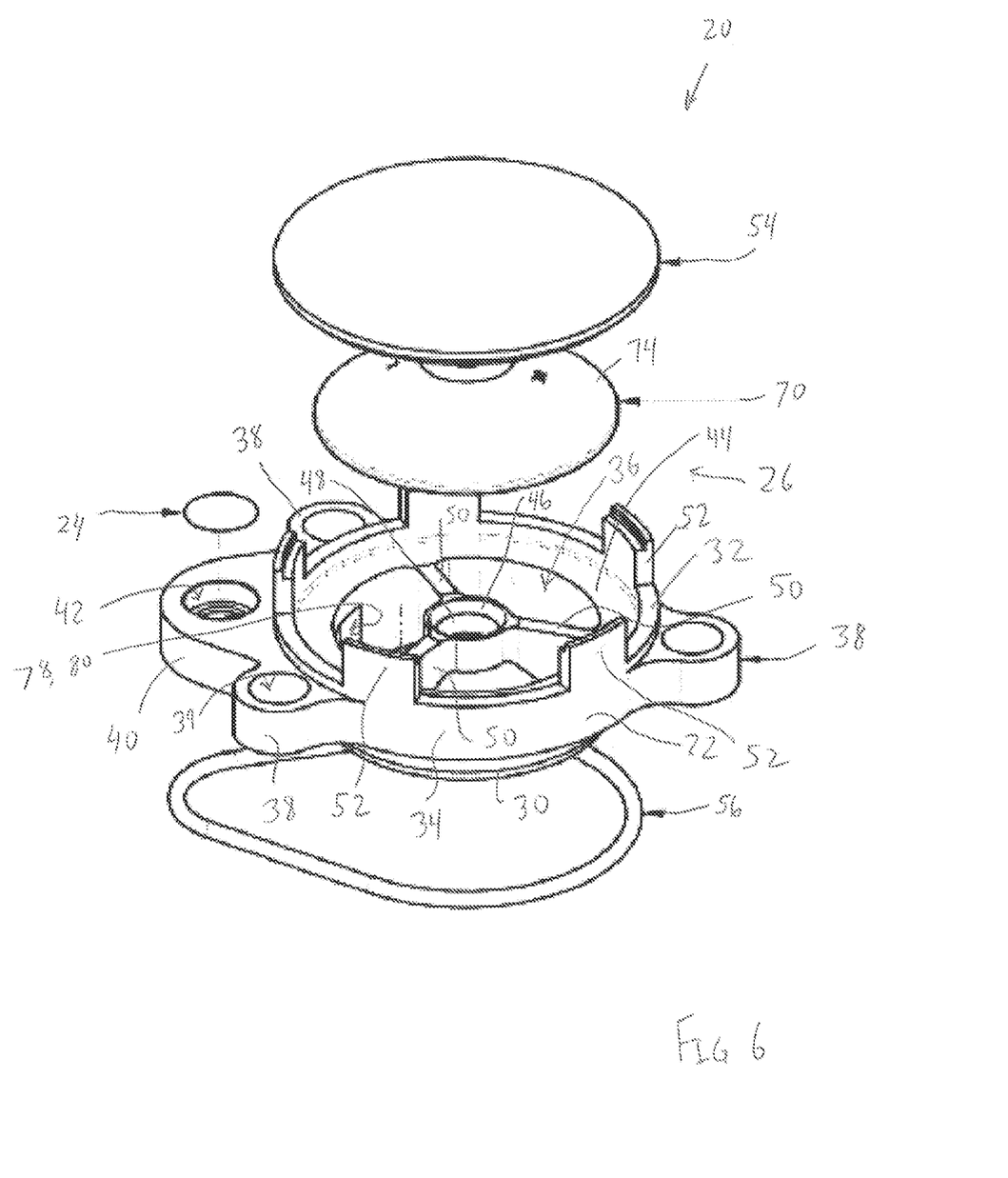
FIG. 6 is an exploded view of the assembly of FIGS. 2-5.
Figure 7:
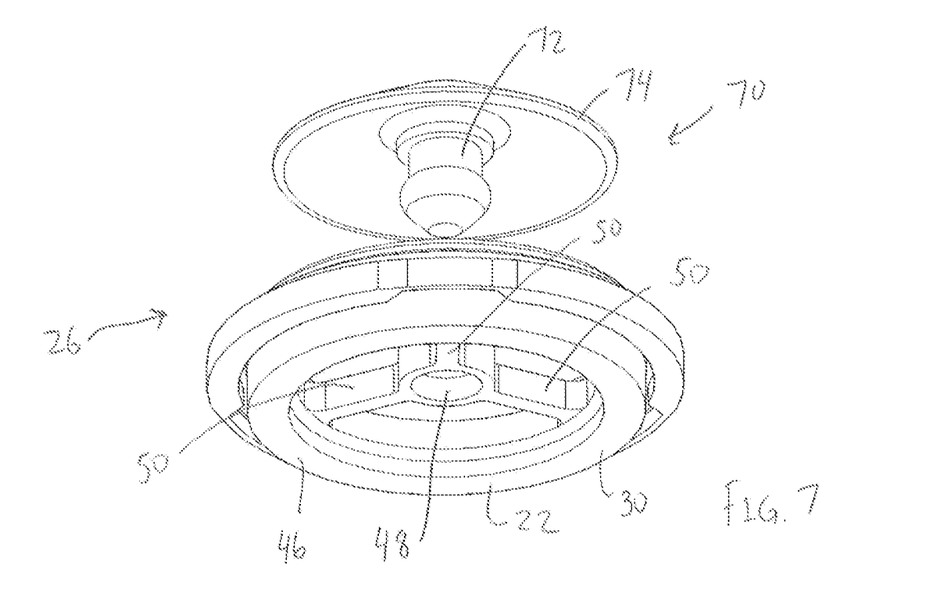
FIG. 7 is an underside perspective isolated view of the central hub and the flapper component of the assembly of FIGS. 6.
Figure 8:
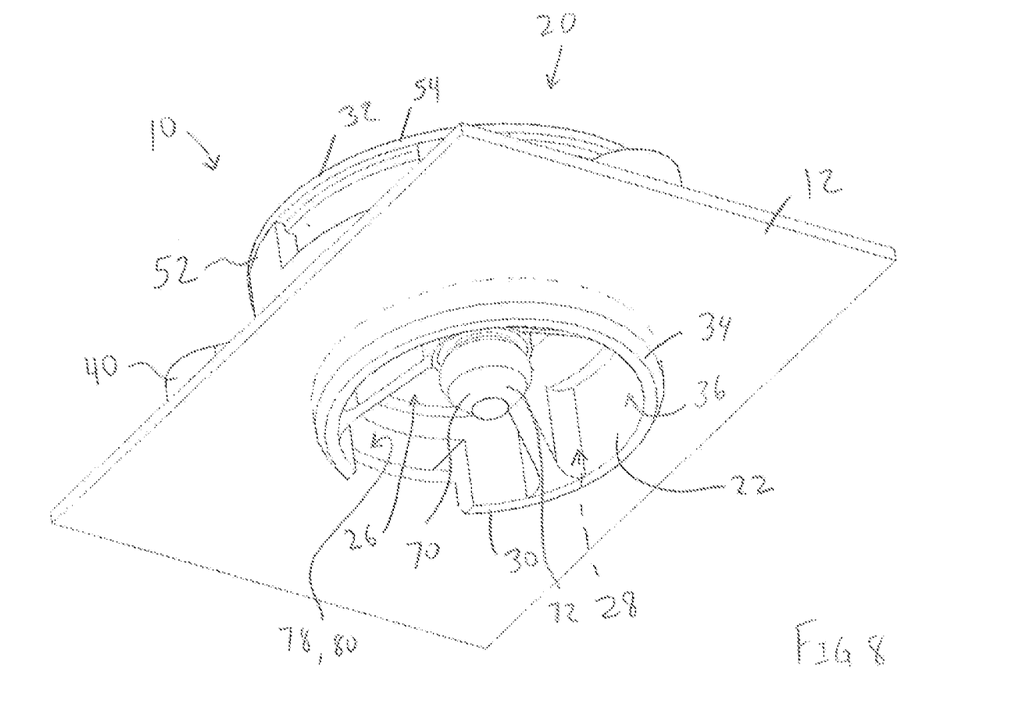
FIG. 8 is an underside view of the assembly of FIGS. 2-4.

As best shown in FIG. 6, the body 22 includes a central portion 34 having or defining a central/main opening 36 and a set of lugs 38 coupled to and circumferentially spaced about the central portion 34. A lug opening 39 can be formed through each lug 38. The body 22 further includes a membrane tab 40 coupled to a side of the central portion 34, and a membrane opening 42 is positioned in the membrane tab 40. The central portion 34 of the body 22 further includes or defines a generally flat, circumferentially-extending valve seat 44, a central hub 46 with a coupling opening 48 positioned therethrough, and a set of radially-extending, circumferentially spaced vanes 50 coupled to the hub 46 to position the hub 46 in the desired location.

The body 22 further includes a set of upwardly-extending, circumferentially spaced spacer tabs 52. The assembly 20 can include a protective cover 54 positioned on or coupled to the spacer tabs 52. The cover 54 is coupled to the spacer tabs 52 by an interference fit, press fit or the like to provide protection to the valve 26, but the cover 54 and spacer tabs 52 can be omitted if desired. The body 22 and/or cover 54 can be made of a wide variety of materials, including but not limited to high temperature resistant thermoplastics such as nylon, polysulfones, polyetherimides, polyphenylsulfone, polyphthalamide, polyphenylene sulfide, glass filled composites, etc.

The body 22 can be coupled to the casing 12 by any of a variety of desired mechanisms, but in one case fasteners (not shown) are passed through the lug openings 39 of the lugs 38 to secure the body 22/assembly 20 in place. In other embodiments, the body 22 can be coupled to the casing 12 by a snap fit, or by bayonet-style attachment (e.g. ½ turn or ¼ turn bayonet-style attachment), directly screwing the body 22 in place, or other methods/means. If desired, a body seal 56, having a shape that generally corresponds to the shape of the body 22, is positioned between the body 22 and the casing 12 to provide a seal therebetween.

The membrane 24 can be positioned in and/or cover and/or span the membrane opening 42 located in the membrane tab 40. The membrane 24 can be breathable and semi-permeable in that the membrane 24 can generally allow all or certain gases to pass therethrough, but generally liquid impermeable (and more specifically, generally water-impermeable in one case) to block liquids (e.g. water in one case) from passing therethrough, particularly into the inner cavity 14. The membrane 24 thus can be permeable (e.g. to air and/or certain gases) to allow air and other gases to permeate across the membrane 24 to maintain or seek to maintain pressure balance between the inner cavity 14 and the ambient environment 18.

Figure 9:
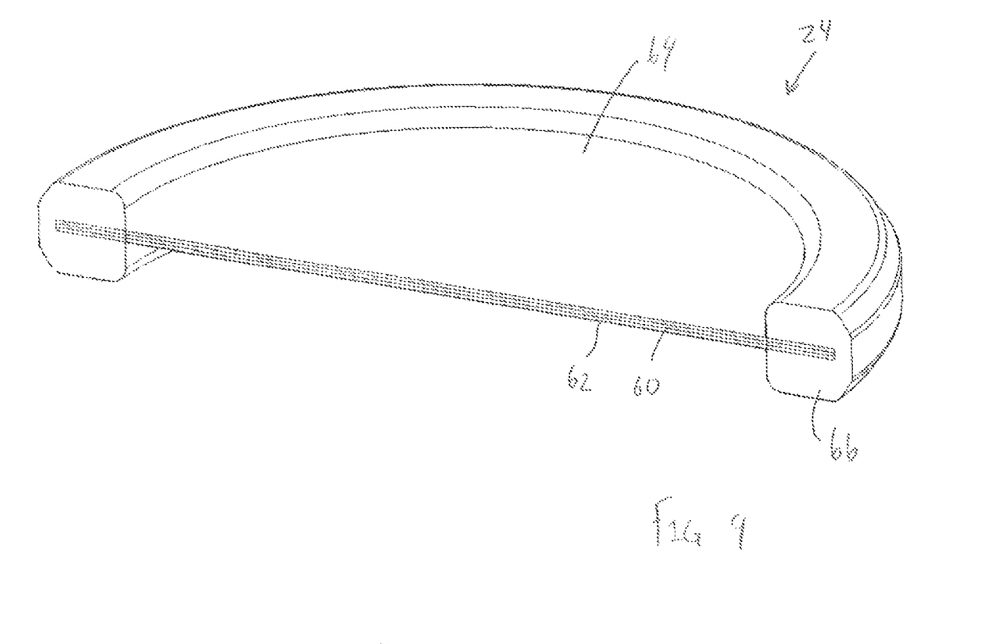
FIG. 9 is a perspective cross sectional view of a membrane of the assembly of FIGS. 2-6.

With reference to FIG. 9, in one embodiment the membrane 24 includes or is made of three layers: a central or middle membrane layer 60 that is positioned between an inner (lower or cavity-facing) protective layer 62 and an outer (upper or ambient-facing) protective layer 64. The membrane layer 60 can be, in one case, a layer that primarily controls the permeation of gas and/or lack of permeation of liquid across the membrane 24 as a whole. The membrane layer 60 can be made of or include synthetic fluoropolymers, such as PTFE (polytetrafluoroethylene), but can also be made of or include metals, such as sintered metal, or other polymers and/or thermoplastic polymers and/or fluorinated polymers, including polyethylene or polypropylene, or ceramics such as ceramic wafers, ceramic coated fabrics, etc.

The semi-permeable nature of the membrane layer 60 can result, in one case, from gaps, pores or channels between polymer chains or the like of the material of the membrane layer 60. The membrane layer 60 (and/or the membrane 24 as a whole) can have various airflow rates, and in one case the membrane layer 60 (and/or the membrane 24 as a whole) has an airflow of at least about 0.25 L/min in one case, or less than about 5 L/min in another case, or between about 0.25 L/min and about 5 L/min in one case, at all differential pressures in the range between about 40 mbar and about 100 mbar. The membrane layer 60 (and/or the membrane 24 as a whole), can have a porosity, or a pressure equalization rate, of at least about 0.5 L/min/0.785 cm$^2$ at 40 mbar in one case, or less than about 5 L/min/0.785 cm$^2$ at 70 mbar in another case, or between about 0.5 L/min/0.785 cm$^2$ at 40 mbar and about 5 L/min/0.785 cm$^2$ at 70 mbar (with it being understood that this is a bracketed range in which the two values of about 0.5 L/min/0.785 cm$^2$ at 40 mbar and about 5 L/min/0.785 cm$^2$ at 70 mbar can represent two data points on a graph, and the range includes all values falling with an area defined, at its upper bound, by a line between the two data points, and all areas below such line/upper bound).

The inner 62 and outer 64 protective layers can be breathable and allow gases to generally freely flow therethrough and in one case may not have any measurable impact on the flow of gases (and, in some cases, liquids) therethrough and/or through the membrane 24. The inner 62 and/or outer 64 protective layers can be configured to provide one or more of abrasion/impact protection, heat protection or water/moisture protection to the membrane layer 60. In one case the inner 62 and outer 64 protective layers are made of the same material and/or have the same properties, but if desired the layers 62, 64 can be made of differing material and/or have differing properties. In one case one or both of the inner 62 and outer 64 layers are compact woven aramid materials with extreme high temperature resistance (e.g. 500° C. or higher in one case), such as NOMEX® material, but can also or instead be made of other woven materials such polyamide-imide, polyether ether ketone (PEEK), as well as nonwoven materials such as PTFE, perfluoro elastomeric compounds such as FFKM. In an alternative embodiment, the two protective layers 62, 64 can be positioned immediately adjacent to each other on the inner side of the membrane 24 (facing the inner cavity 14), and the layer 60 is positioned as the upper-most layer of the membrane 24 and is directly exposed to ambient environment 18. This arrangement can provide greater thermal protection to the membrane 24/layer 60 from high temperatures in the inner cavity 14.

As outlined in greater detail below, the protective layers 62, 64 can provide heat shield properties. In addition the protective layers 62, 64 can also have hydrophobic properties by the inherent material(s) that they are made from and/or by having surfaces treatments (such as a fluorinated polymer chemical deposition such as PTFE) applied to the protective layers 62, 64 to protect the membrane layer 60 against moisture ingress. Thus the membrane 24 (and/or each individual layer 60, 62, 64 thereof) may be hydrophobic and resist moisture ingress but be freely or generally freely air permeable (e.g. present negligible or no barrier to the flow of air or gases; in one case having an equalization rate that is at least five times greater than that of the membrane layer 60, or at least ten times greater in another case, or at least twenty-five times greater in yet another embodiment) and allow the passage of air or gases therethrough to allow equalization of pressure.

As shown in FIG. 9, the membrane 24 can include and/or be coupling to a mounting ring 66 which can be made of various materials such as thermoplastic and/or corrosion resistant metal and/or the materials outlined above for the body 22. The layers 60, 62, 64 of the membrane 24 can be coupled to the ring 66 at their outer peripheries and/or facially to each other by ultrasonic welding, mechanical coupling or other means or methods, and in other cases are not facially coupled together.

While the membrane 24 may allow air or gases to permeate therethrough, the membrane 24 can have a limited rate of air or gas flow thereacross. Thus the valve 26 can allow pressure equalization thereacross when a relatively high pressure is present in the inner cavity 14 (and/or in some cases, present in the ambient environment 18). For example, in the case of a thermal runaway event of the chemical reactor 16, pressure inside the inner cavity 14 can increase significantly in a short period of time. In this case, the valve 26 can open to allow the rapid flow of air or gases therethrough.

The valve 26 can be or take the form of a check valve, or other one-way (or two-way) valve that opens upon a sufficient or predetermined pressure differential. In one case the valve 26 take the form of an umbrella valve include flapper component 70 in a general "mushroom" shape having a central stem 72 and a diaphragm 74 coupled thereto. The central stem 72 can have a barbed shaped at its distal/lower end and is passed through the coupling opening 48 of the central hub 46 to secure the flapper component 70 in place, or coupled by various other mechanisms or means. The diaphragm 74 is a generally disc-shaped component that has an outer perimeter normally in contact with the valve seat 44. The diaphragm 74/valve 26 is shaped and/or configured to be biased to its closed or sealed position (FIGS. 3 and 4) wherein the diaphragm 74 engages the valve seat 44 and generally closes or seals the central/main opening 36 of the body 22 to thereby prevent the ingress of dust, particles, moisture, etc. into the inner cavity 14 and also block the egress of gases from the cavity 14. The diaphragm 74 can be configured to assume a generally convex shape when in the closed position.

Figure 3:
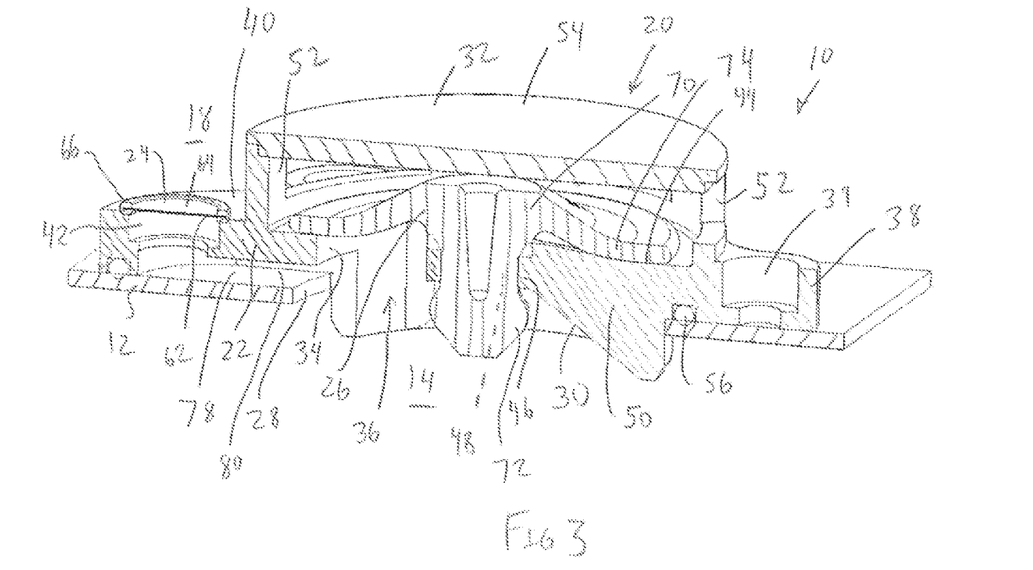
FIG. 3 is a perspective cross section of the assembly and casing of FIG. 2, with the valve in a closed position.
Figure 4:
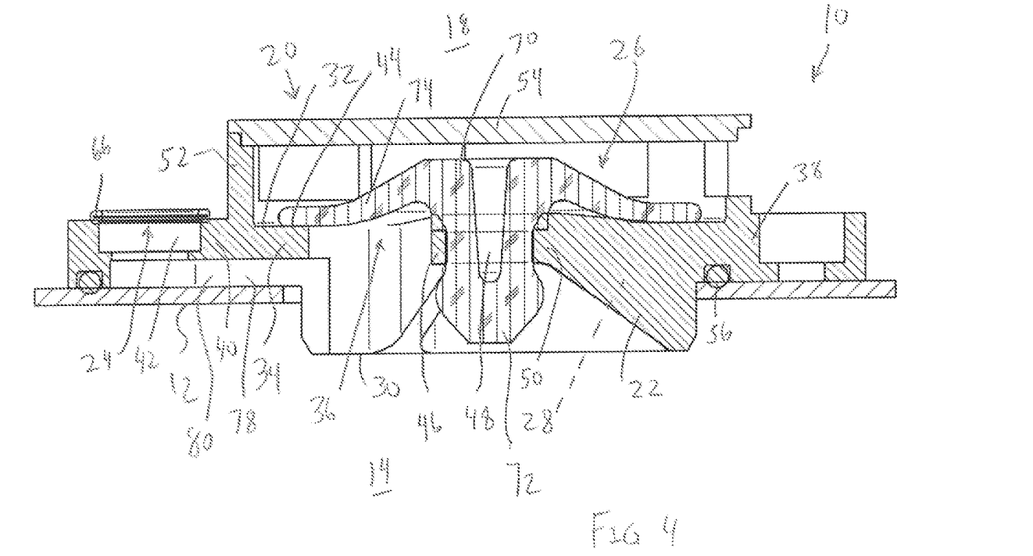
FIG. 4 is a side view of the components of FIG. 3.
Figure 5:
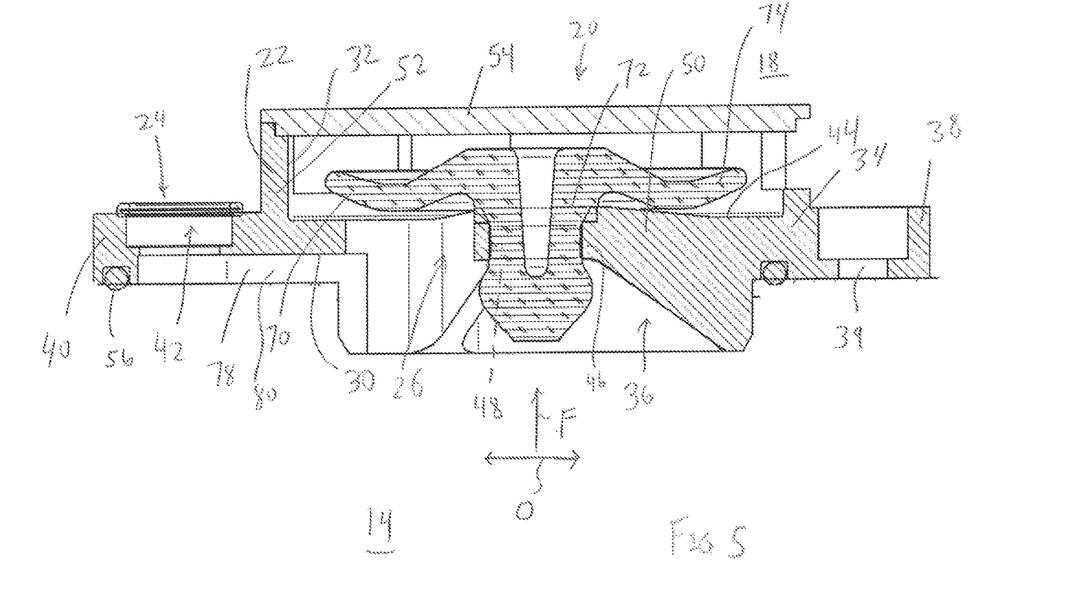
FIG. 5 shows the assembly of FIG. 4, with the valve in an open position and without the part of the casing.

When there is a sufficient pressure differential across the valve 26/flapper component 70 (e.g. a positive pressure in the cavity 14, in one case), the outer portions of the diaphragm 74 can flex/move upwardly, away from the valve seat 44, as shown in FIG. 5 to allow gas to flow therethrough. Once the pressure differential is sufficiently dissipated, the valve 26/diaphragm 74 returns to its closed position, as shown in FIGS. 3 and 4. The valve 26/diaphragm 74 can be designed to have various differing opening/closing pressures as desired, but in one case the valve 26/diaphragm 74 has an opening pressure of between about 20 mbar and about 50 mbar, or greater than about 5 mbar in one case, or greater than about 20 mbar in another case, or less than about 100 mbar in another case, or less than about 50 mbar in yet another case. The valve 26 can be designed to have a relatively low opening pressure which enables fast response of the valve 26 in response to internal pressures of the casing 12. When open, the valve 26 may provide an airflow therethrough of at least about 2,000 L/min in one case, or at least about 6,000 L/min in another case, and less than about 10,000 L/min in yet another case.

The flapper component 70/diaphragm 74 can be made of any of a wide variety of materials, including elastomeric materials and/or thermoset rubber such as silicone, fluorosilicone, fluorocarbon or the like. The diaphragm 74 can have a variety of sizes and dimensions, but in one case has an outer diameter of between about 30 mm and about 50 mm, and may have a thickness that tapers from about 2-4 mm at the central sections, to about 1-3.5 mm at the outer diameter.

The assembly 20 as a whole, and/or the valve 26 and/or membrane 24 together or separately, can be configured to resist water or moisture ingress or passing therethrough (to enter the inner cavity 14 in one case) at water pressures of at least about 0.1 meter water column in one case, or at least about 0.5 meter water column in another case, or at least about 1 meter water column in another case, or at least about 3 meter water column in yet another case. The assembly 20 as a whole, and/or the valve 26 and/or membrane 24 together or separately can be configured to resist dust ingress or passing therethrough (to enter the inner cavity 14 in one case) in a manner which meets the IP69K rating based upon the ingress protection rating system, as per the IEC standard 60529 published by the IEC Technical Committee 70 (more particularly IEC 60529:1989+A1:1999+A2:2013, which standard(s) is hereby incorporated by reference).

In the embodiments of FIGS. 1-10, the membrane 24 is laterally offset from the valve 26 in an offset direction O (FIG. 5) that is oriented generally perpendicular relative to a direction of a flow of gas F through the valve 26 (aligned with a central axis of the valve 26 in one case). In one case the membrane 24 is entirely laterally offset from the valve 26, such that no portion of the membrane 24 overlaps with the valve 26 in the flow direction F. The assembly 20 can include a channel 78 that extends at least partially in the offset direction O, and provides a path of fluid communication between the membrane 24 and the inner cavity 14 of the casing 12. The channel 78 can be defined/formed at least partially by a closed or generally closed body channel portion 80 formed on an underside of the body 22. In this manner, when the body 22 is fit in place on the casing 12, the body channel portion 80, and an upper surface of the casing 12, together define the channel 78. However, if desired the channel 78 can be entirely formed in the body 22 such as by a bore/channel formed entirely in the body 22 such that the channel 78 has an outer perimeter entirely defined by the body 22. The body channel portion 80 can be closed/sealed or generally closed/sealed with two open ends, and in fluid communication with the membrane 24 at one end and the valve 26 at the other end to thereby provide direct fluid communication between the membrane 24 and valve 26.

The channel 78 can have a relatively small cross section if desired, such as, at its narrowest point in one case and/or has an average cross sectional area, less than about 20% of a surface area of the central/main opening 36 in one case, or less than about 10% in another case, or less than about 5% in another case, and or greater than about 0.1% in one case, or greater than about 1% in yet another case. Alternatively the channel 78 can have a smallest and/or average cross sectional area of between about 100 mm$^2$ and about 300 mm$^2$, and less than about 400 mm$^2$ in one case.

The channel 78 provides a tortuous path and/or connection between the membrane 24/membrane opening 42 and the inner cavity 14, to provide protection to the membrane 24. In particular, in the case of a thermal runaway event, the restricted size of the channel 78 may limit the amount of pressure differential that can rapidly propagate through the channel 78 to provide some pressure protection to the membrane 24. In addition, the tortuous path/lateral offset of the channel 78 can help protect the membrane 24 from any fragments or particulates that may be rapidly propelled (e.g. in the flow direction F) in the case of a thermal runaway event. In this manner there is no direct path from the inner cavity 14 to the membrane 24, in a direction parallel to the direction of flow through the valve 26. In contrast, in one case the valve 26 may be in direct fluid communication with the inner cavity 14 such that there is a direct path from the inner cavity 14 to the valve 26 in a direction parallel to the flow direction F which can enable rapid expulsion of gas. In addition the valve 26 may be more robust than the membrane 24 and thus able to better withstand high pressures and/or projectiles.

The valve 26 may also be configured to withstand/accommodate relatively high pressures therethrough. For example, the vanes 50 and central hub 46 may be configured to present relatively low resistance to fluid. For example, in one case the vanes 50 and central hub 46, together, make up and/or block a surface area of less than about 10% in one case, or less than about 5% in another case, of the surface area defined within the central portion 34 of the hub (e.g. defined by a perimeter of the central/main opening 36 of the body 22 when viewed in the flow direction F).

In this manner, the configuration and positioning of the membrane 24 (including the lateral offset provided by the channel 78), the materials of the membrane 24 (including at least the inner 62 and/or outer 64 protective layers), and the configuration of the valve 26, enable the assembly 20 as a whole, and/or the valve 26 and/or membrane 24 together or separately, to withstand the high pressures and/or temperatures and/or gas flow associated with a thermal runaway event, and still maintain structural integrity. Thus in one case the assembly 20 as a whole, and/or the valve 26 and/or membrane 24, together and/or separately, can maintain its structural integrity after being exposed to a temperature of about 500° C. for at least or up to about one second in one case, or at least or up to about ten seconds in another case, or at least or up to about sixty seconds in another case and/or after being exposed to a pressure differential of about 33 mbar thereacross for at least or up to about one second in one case or at least or up to about five seconds in another case, or at least or up to about sixty second in yet another case, and/or after being exposed to a pressure differential of about 250 mbar thereacross for at least or up to about one second in one case, or at least or up to about five seconds in another case, or at least or up to about sixty seconds in yet another case, and/or after being exposed to a pressure differential of about 500 mbar thereacross for at least or up to about one second in one case, or at least or up to about five seconds in another case, or at least or up to about sixty seconds in yet another case.

In addition, the assembly 20 as a whole, and/or the valve 26 and/or membrane 24, together and/or separately, maybe able to maintain its structural integrity after being exposed to a gas flow of about 2,000 L/min on one case, or about 6,000 L/min in another case, therethrough (e.g. entirely and/or primarily through the valve 26) for at least or up to about one second in one case, or at least or up to about five seconds in another case, or at least or up to about sixty seconds in yet another case. In some cases the assembly 20 (and its individual components) may need to be able to withstand high temperatures for a longer period of time than high pressures, since a thermal runaway event typically presents a relatively intense but short-lived pressure burst, followed by longer-lasting elevated temperatures.

In one case, "maintaining structural integrity" means the assembly 20 as a whole, and/or the valve 26 and/or membrane 24 together or separately, as appropriate, can continue to operate as designed and described herein. For example, in one case this means the assembly 20 (including the membrane 24) remain generally sealed and unruptured and/or can continue to allow gases to permeate therethrough; and/or the valve 26 is unruptured and remains movable between the closed position in which it is generally seals the central/main opening 36 and the open position which allows gases to flow therethrough.

Figure 10:
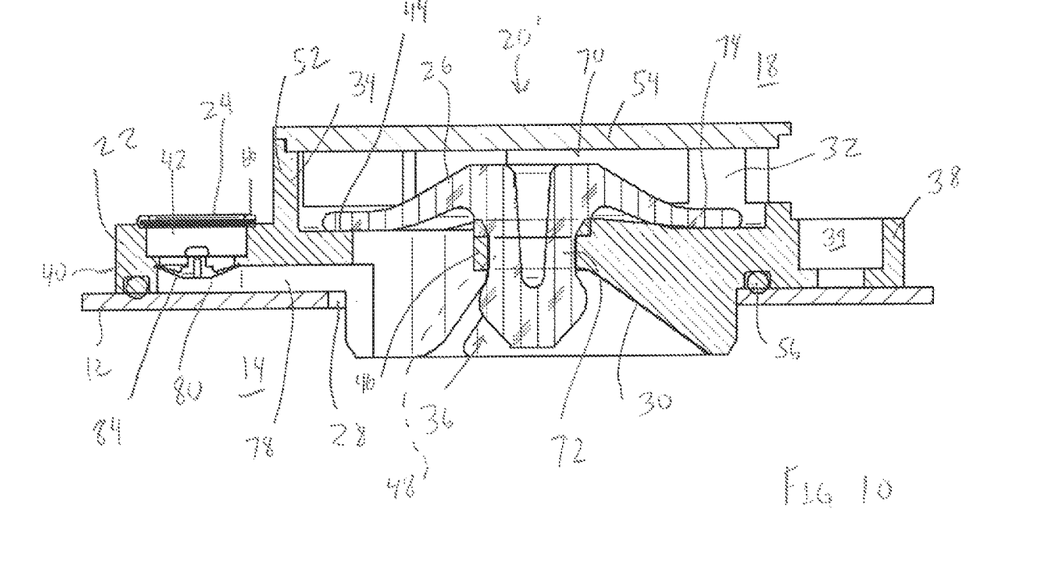
FIG. 10 is a side cross sectional view of an alternative embodiment of the pressure accommodating assembly.

FIG. 10 illustrates an alternative embodiment of the assembly 20' which is generally the same in construction and operation as the embodiment of FIGS. 1-9, but in which a membrane valve 84 is positioned in fluid communication with the channel 78 and/or membrane opening 42 to selectively allow/block gas to flow through the channel 78/membrane 24. The membrane valve 84 can be an umbrella valve, like the valve 26 described above, and can be biased to a closed position, and configured to open when there is sufficient pressure differential thereacross (higher pressure in the ambient environment 18, in the illustrated embodiment). In this case the membrane valve 84 may generally block the ingress of gases through the membrane 24 into the cavity 14 unless the preset differential is achieved. If desired the orientation and/or positioning of the membrane valve 84 relative to the membrane 24 can be reversed to, for example, block the egress of gases through the membrane 24 from the cavity 14 unless the preset pressure differential is reached. Thus depending on the positioning and orientation of the membrane valve 84, the membrane valve 84 can enable the system of FIG. 10 to maintain either an increased pressure (relative to ambient, shown in the FIG. 10 embodiment) in the casing 12, or a reduced pressure (relative to ambient) in the casing 12, since certain chemical reactors may function better at reduced and/or elevated pressures.

Incoming gases are passed through the membrane 24, which can block contaminants and thus provide a favorable operating environment for the chemical reactor 16. In contrast, any exhaust gases can pass through the valve 26 (instead of the membrane 24, or the membrane 24 and valve 26), and there is typically less concern with exhausting any contaminants since: 1) the environment inside the casing 12 is generally clean and thus lacks contaminants in the first place; and 2) the valve 26 exhausts to the ambient environment 18 which is not necessary or practical to keep clean of contaminants. The membrane valve 84 also enables the assembly 20 to more precisely control the pressure in the casing 12 by regulating the opening pressure across the valve 26, controlling the flow of air or gas into the casing 12. This effectively seals off the casing 12 and limits the ingress of air or gas until a prescribed delta pressure is reached across the membrane valve 84. The range of pressures for opening the membrane valve 84 can in one case range from about 20 mbar to about 500 mbar, and can be selected to meet the optimal operating pressure requirements of the cells of the chemical reactor 16. In addition, when the membrane valve 84 is positioned between the membrane 24 and the inner cavity 14 in the flow path direction (as shown in FIG. 10), and the membrane valve 84 can thereby provide thermal protection, pressure protection and/or protection from particulates and the like in the case of a thermal runaway event or the like.

Figure 11:
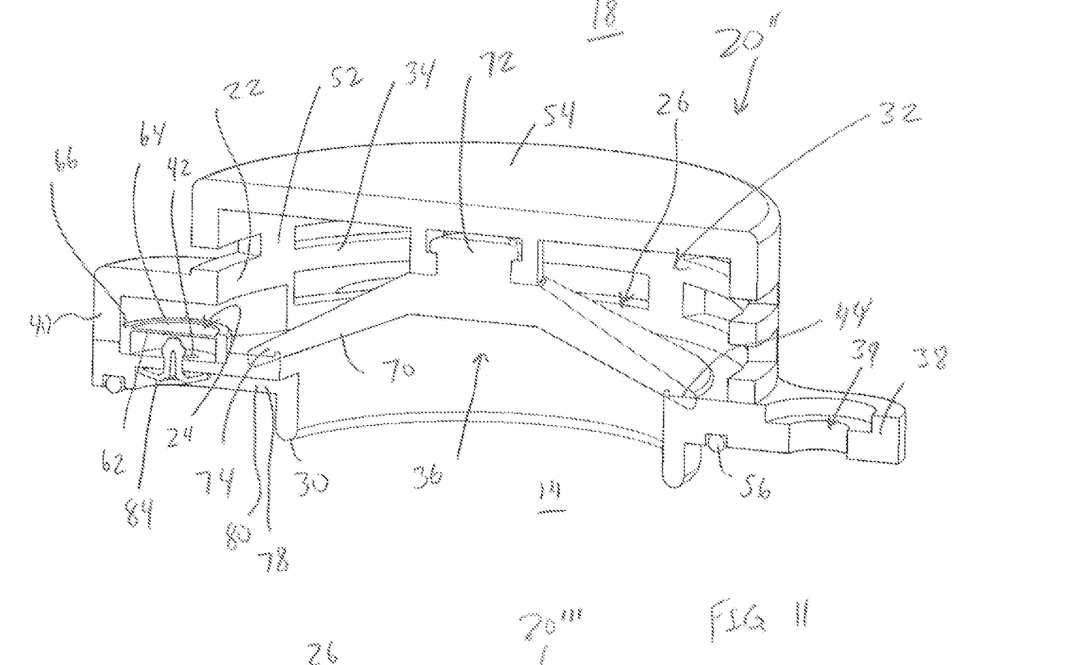
FIG. 11 is a front perspective, partial cross sectional view of another alternative embodiment of the pressure accommodating assembly.

FIG. 11 illustrates an embodiment of the assembly 20" that is somewhat similar in functionality to the embodiment shown in FIG. 10. In particular, the assembly 20" includes a membrane valve 84 positioned and configured to selectively allow/block gas to flow through the membrane 24. The membrane valve 84 can be an umbrella valve biased to a closed position, and configured to open when there is sufficient pressure differential thereacross and thus provide a functionality similar to that provided by the membrane valve 84 of FIG. 10. In the embodiment of FIG. 11, an upper surface of the membrane 24 is covered by the part of the body 22, and is in direct fluid communication with an upper surface of the valve 26/flapper component 70 (and thus if fluid communication with the ambient environment 18. In addition, in the FIG. 11 embodiment the flapper component 70 is coupled to an underside of the cover 54 via the central stem 72, and the cover 54 is integrated into the body 22. It is noted that these constructions/configurations can be used in any other embodiments disclosed herein. The FIG. 11 embodiment provide a relatively high flow rate through the assembly 20" while minimizing restrictions and reducing the size/footprint of the assembly 20".

Figure 12:
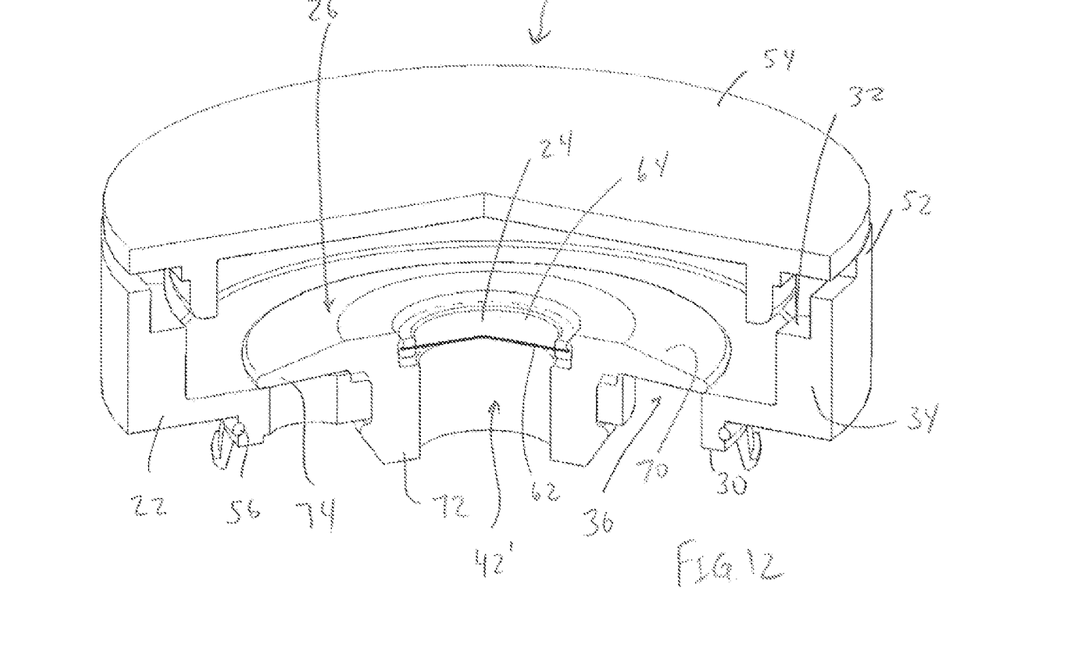
FIG. 12 is a front perspective, partial cross sectional view of yet another alternative embodiment of the pressure accommodating assembly.

In the embodiments described above, the membrane 24 is laterally offset from the valve 26 and/or fluidly coupled to the inner cavity 14 and/or valve 26 via the channel 78. However, in the embodiment of the assembly 20''' shown in FIG. 12, the membrane 24 is positioned inside the valve 26 and aligned with the valve 26 (relative to the flow direction F in one case). In this case the central stem 72 of the flapper component 70 includes the membrane opening 42' positioned therein. This embodiment eliminates the need for a separate membrane opening, and in addition the channel 78 is not utilized. The embodiment of FIG. 12 may provide a more compact assembly 20''' that is easier to manufacture, but does not necessarily have the protective features provides by the offset and the channel 28 as described above.

Although the invention is shown and described with respect to certain embodiments, it should be clear that modifications will occur to those skilled in the art upon reading and understanding the specification, and the present invention includes all such modifications.

What is claimed is:

1. A system comprising a pressure accommodating assembly including:
   a body having a first side and a second side;
   a gas permeable membrane coupled to the body and configured to allow gases to permeate therethrough to thereby move from the first side to the second side; and
   a pressure relief valve coupled to the body, wherein the pressure relief valve is biased to a closed position to generally block a flow of gases therethrough and is configured to move to an open position when there is a predetermined pressure differential thereacross to allow gases to flow therethrough to move from the first side to the second side, wherein the pressure accommodating assembly is configured to maintain its structural integrity after being exposed to a temperature of about 500° C for at least one second.

2. The system of claim 1 wherein the pressure accommodating assembly is configured to maintain its structural integrity after being exposed to a pressure differential of about 250 mbar thereacross for at least five seconds.

3. The system of claim 1 wherein the pressure relief valve is configured to accommodate a gas flow of about 6000 L/min therethrough for at least one second and maintain its structural integrity thereafter.

4. The system of claim 1 wherein the gas permeable membrane and the pressure relief valve are configured to both be simultaneously exposed to a first pressure on the first side, and are both configured to be simultaneously exposed to a second pressure on the second side.

5. The system of claim 1 wherein the gas permeable membrane is generally aligned with the pressure relief valve relative to a direction of a flow of gas through the pressure relief valve.

6. The system of claim 1 further comprising a membrane valve coupled to the body, wherein the gas permeable membrane valve is biased to a closed position to generally block a flow of gases therethrough to generally block gases permeating through the membrane from flowing through the pressure accomodating assembly, and is movable to an open position when there is a predetermined pressure differential thereacross to allow gases permeating through the gas permeable membrane to flow through the pressure accomodating assembly.

7. The system of claim 1 wherein the pressure accommodating assembly is configured to continue operating after being exposed to a temperature of 500° C. for at least one second such that, after such exposure, the gas permeable membrane selectively allows gases to permeate therethrough, and such that the pressure relief valve remains biased to the closed position and is configured to move to its open position upon experiencing a predetermined pressure differential thereacross.

8. The system of claim 1 wherein the gas permeable membrane includes a microporous thermoplastic layer positioned between an inner protective layer and an outer protective layer and wherein the gas permeable membrane is generally liquid impermeable.

9. The system of claim 8 wherein the microporous thermoplastic layer is polytetrafluoroethylene and wherein the inner and outer protective layers are both compact woven aramid materials.

10. The system of claim 1 wherein the gas permeable membrane is laterally offset from the pressure relief valve in a direction generally perpendicular relative to a direction of a flow of gas through the pressure relief valve.

11. The system of claim 10 wherein the body includes or defines a generally closed body channel portion that provides fluid communication between the gas permeable membrane and the pressure relief valve at least partially in the lateral direction.

12. The system of claim 1 further comprising a generally sealed casing having an inner cavity, wherein the pressure accommodating assembly is sealingly coupled to the generally sealed casing to allow gas to pass therethrough to provide pressure balance to the generally sealed casing.

13. The system of claim 12 wherein the gas permeable membrane is fluidly coupled to the inner cavity by a tortuous path.

14. The system of claim 12 wherein at least one of the body or the casing includes or defines a channel portion that provides fluid communication between the gas permeable membrane and the inner cavity at least partially in a lateral direction such that there is no direct path from the inner cavity to the gas permeable membrane in a direction parallel to a flow through the pressure relief valve.

15. The system of claim 12 wherein the pressure relief valve is in direct fluid communication with the inner cavity such that there is a direct path from the inner cavity to the pressure relief valve in a direction parallel to a flow through the pressure relief valve.

16. The system of claim 12 further comprising a chemical reactor positioned in the generally sealed casing.

17. A method comprising:
    accessing a pressure accommodating assembly including a body having a first side and a second side, a gas permeable membrane coupled to the body and a pressure relief valve coupled to the body, wherein the pressure relief valve is biased to a closed position to generally block a flow of gases therethrough;
    allowing gases to permeate through the gas permeable membrane to thereby move from the first side to the second side; and
    upon experiencing a predetermined pressure differential thereacross, allowing the pressure relief valve to move to an open position to allow gases to flow therethrough to move from the first side to the second side, wherein the pressure accommodating assembly is configured to be exposed to a temperature of at least about 500° C. for at least about one second, after which the pressure accommodating assembly maintains its structural integrity.

18. The method of claim 17 wherein the pressure accommodating assembly is sealingly coupled to a generally sealed casing having an inner cavity to allow gas to flow therethrough to provide pressure balance to the generally sealed casing, and wherein a chemical reactor is positioned in the inner cavity.

19. A system comprising a pressure accommodating assembly including:
    a body having a first side and a second side;
    a gas permeable membrane coupled to the body and configured to allow gases to permeate therethrough to thereby move from the first side to the second side; and
    a pressure relief valve coupled to the body, wherein the pressure relief pressure relief valve is biased to a closed position to generally block a flow of gases therethrough, wherein the valve is configured to move to an open position when there is a predetermined pressure differential thereacross to allow gases to flow therethrough to move from the first side to the second side, wherein the membrane is laterally offset from the pressure relief valve in a direction generally perpendicular relative to a direction of a flow of gas through the pressure relief valve, and wherein the body at least partially defines a channel portion that provides fluid communication between the gas permeable membrane and the pressure relief valve in at least partially in the lateral direction wherein the pressure accommodating assembly is configured to maintain its structural integrity after being exposed to a temperature of about 500° C. for at least one second.

20. The system of claim 19 further comprising a generally sealed casing having an inner cavity, wherein the pressure accommodating assembly is sealingly coupled to the generally sealed casing to allow gas to pass therethrough to provide pressure balance to the generally sealed casing, and the pressure accommodating assembly is configured such that there is no direct path from the inner cavity to the gas permeable membrane in a direction parallel to the flow of gas through the pressure relief valve.

\* \* \* \* \*